United States Patent [19]

Deutschländer et al.

[11] 4,209,960
[45] Jul. 1, 1980

[54] APPARATUS FOR MAINTAINING CONSTANT THE WEIGHT OF ARTICLE STACKS

[75] Inventors: Gert Deutschländer; August Rebsamen, both of Neuhausen am Rheinfall; René Fluck, Schleitheim, all of Switzerland

[73] Assignee: SIG Schweizerische Industrie-Gesellschaft, Neuhausen am Rheinfall, Switzerland

[21] Appl. No.: 961,255

[22] Filed: Nov. 16, 1978

[30] Foreign Application Priority Data

Aug. 22, 1978 [CH] Switzerland ............... 8873/78

[51] Int. Cl.² .................. B65B 57/00; B65B 57/20
[52] U.S. Cl. .................................. 53/502; 53/504; 53/532; 53/542
[58] Field of Search .............. 53/501, 502, 503, 149, 53/153, 532, 504, 542

[56] References Cited

U.S. PATENT DOCUMENTS

| | | | |
|---|---|---|---|
| 3,562,775 | 5/1968 | Mullins | 53/542 X |
| 3,811,549 | 5/1974 | Preisig | 53/542 X |
| 3,988,875 | 11/1976 | Fay | 53/532 X |
| 4,065,911 | 1/1978 | Fagan | 53/502 X |
| 4,098,392 | 7/1978 | Greene | 53/532 X |
| 4,136,504 | 1/1979 | Wyslotsky | 53/503 X |

*Primary Examiner*—Horace M. Culver
*Attorney, Agent, or Firm*—Spencer & Kaye

[57] ABSTRACT

An article packing system includes a first conveyor for advancing a series of flat articles; at least two stack-forming devices for consecutively forming stacks of variable length from the articles received from the first conveyor; a second conveyor extending from the stack-forming devices for carrying away the stacks; a packing machine for packaging the article stacks received from the second conveyor and a scale for weighing the stacks of articles. The scale is in the conveying path of the second conveyor and is located downstream of the stack-forming devices and upstream of the packing machine as viewed in the direction of article advance on the second conveyor. The latter includes a mechanism for successively advancing the article stacks from the stack-forming devices towards the scale in a direction parallel to the plane of the flat articles. Further, the mechanism sequentially introduces the article stacks into the scale and subsequently advances them from the scale to the packing machine. The scale is operatively connected with the stack-forming devices for varying the length of the stacks in the stack-forming devices as a function of the stack weight measured by the scale.

11 Claims, 8 Drawing Figures

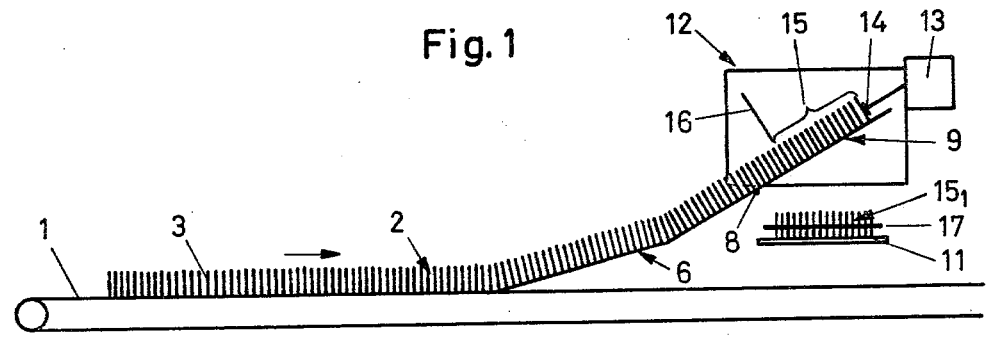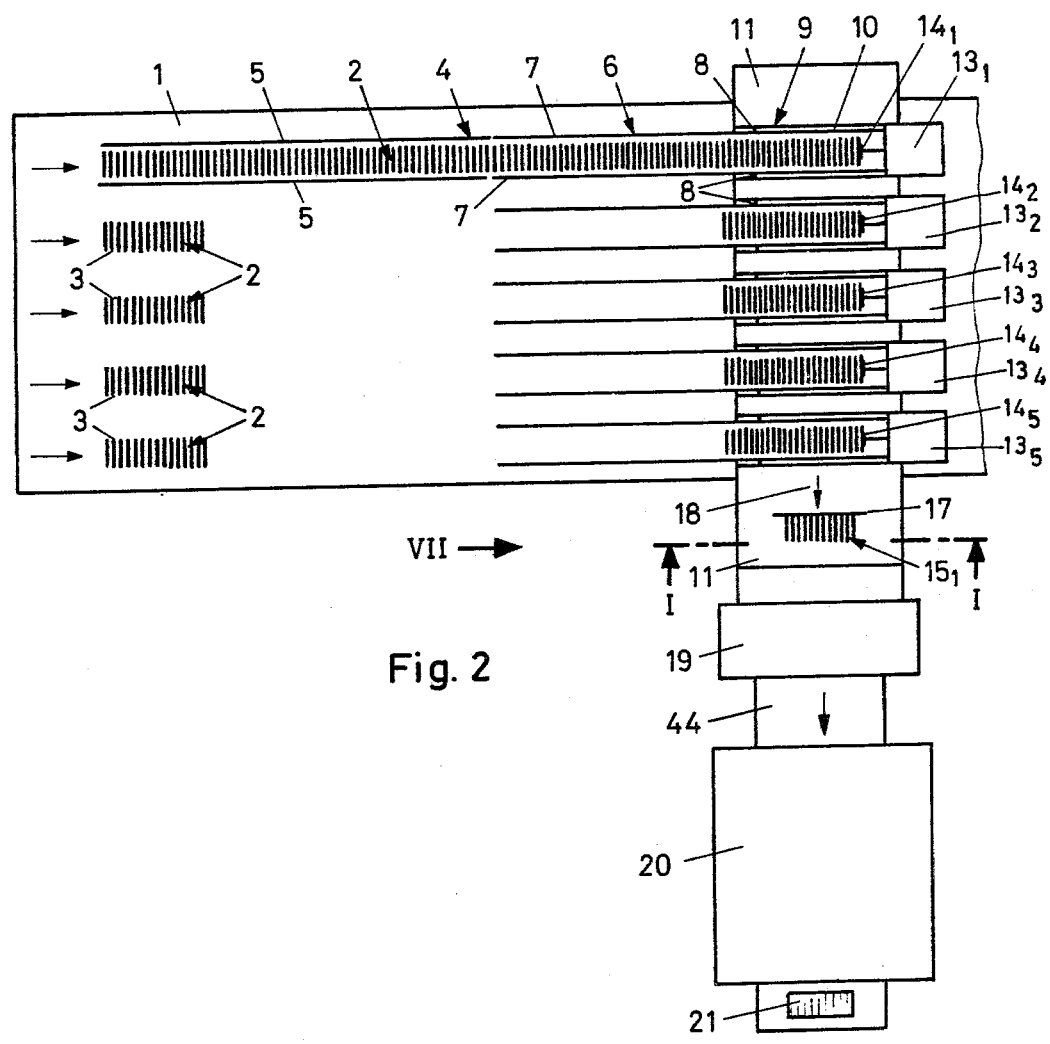

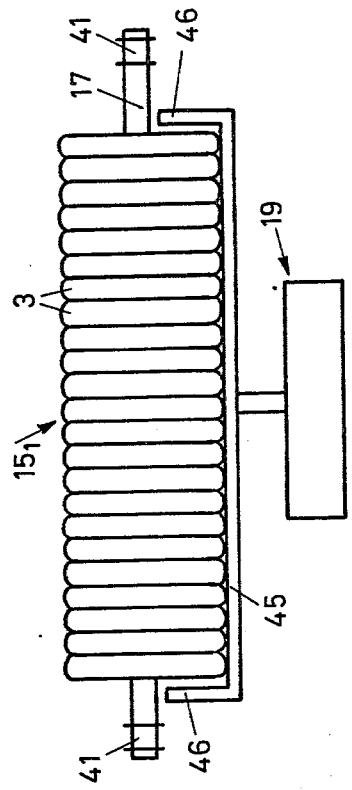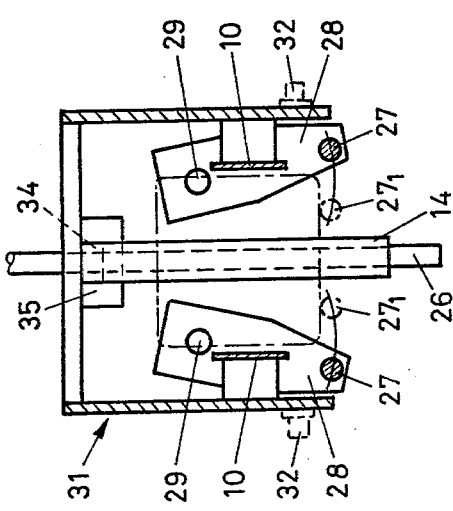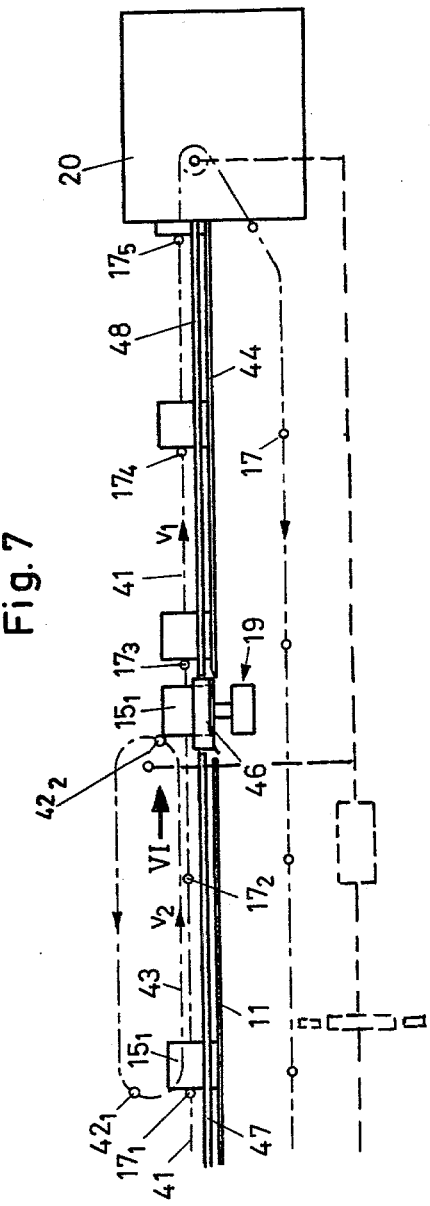

APPARATUS FOR MAINTAINING CONSTANT THE WEIGHT OF ARTICLE STACKS

BACKGROUND OF THE INVENTION

This invention relates to an article packing system and is in particular concerned with an apparatus for maintaining constant the weight of packages containing stacked articles and is of the type which has a scale and at least two devices which form successive stacks from a series of successively conveyed, disc-like articles, such as cookies or the like. The stacks, whose length is adjustable, are thereafter advanced to a packing machine.

In apparatuses of the above-outlined type it has been conventional to arrange the scale downstream of the packing machine for weighing the finished packages. The varying weight of the packages caused, for example, by uncontrollable changes in the baking conditions of, for example, cookies is periodically checked by an attendant. In case of deviations between an actual weight and a desired weight, the length of the stack is accordingly shortened or lengthened. Such an operation, however, requires a substantial input of labor. If a minimum package weight has to be guaranteed, it is necessary to adjust the stack length to a desired weight value which exceeds the guaranteed weight, for example, by 5%. Weight errors in the packaging material are thus inherently included in such a procedure.

SUMMARY OF THE INVENTION

It is an object of the invention to provide an improved apparatus of the above-outlined type which automatically equalizes the weight deviations in the article stacks.

This object and others to become apparent as the specification progresses, are accomplished by the invention, according to which, briefly stated, the article packing system includes a first conveyor for advancing a series of flat articles; at least two stack-forming devices for consecutively forming stacks of variable length from the articles received from the first conveyor; a second conveyor extending from the stack-forming devices for carrying away the stacks; a packing machine for packaging the article stacks received from the second conveyor and a scale for weighing the stacks of articles. The scale is in the conveying path of the second conveyor and is located downstream of the stack-forming devices and upstream of the packing machine as viewed in the direction of article advance on the second conveyor. The latter includes a mechanism for successively advancing the article stacks from the stack-forming devices towards the scale in a direction parallel to the plane of the flat articles. Further, the mechanism sequentially introduces the article stacks into the scale and subsequently advances them from the scale to the packing machine. The scale is operatively connected with the stack-forming device for varying the length of the stacks in the stack-forming devices as a function of the stack weight measured by the scale.

In the apparatus according to the invention, the labor input is very substantially reduced, while a significantly greater accuracy is achieved, since the stack length is controlled by the scale. A weight change of the stack is very rapidly sensed, because the stack is weighed prior to its admission to the packing machine and thus packaging times are not lost and further, the conveyance of the stacks in the direction parallel to the plane of the flat articles provides that the stacks are very rapidly positioned on the scale.

BRIEF DESCRIPTION OF THE DRAWINGS

FIG. 1 is a schematic sectional side elevational view of a preferred embodiment taken along line I—I of FIG. 2.

FIG. 2 is a schematic top plan view of the same embodiment.

FIG. 5 is an enlarged schematic sectional view taken along line V—V of FIG. 3.

FIG. 6 is a schematic end elevational view of a component as seen in the direction of the arrow VI of FIG. 7.

FIG. 7 is a schematic side elevational view of the same embodiment as seen in the direction of the arrow VII of FIG. 2.

DESCRIPTION OF THE PREFERRED EMBODIMENT

Figure 3:
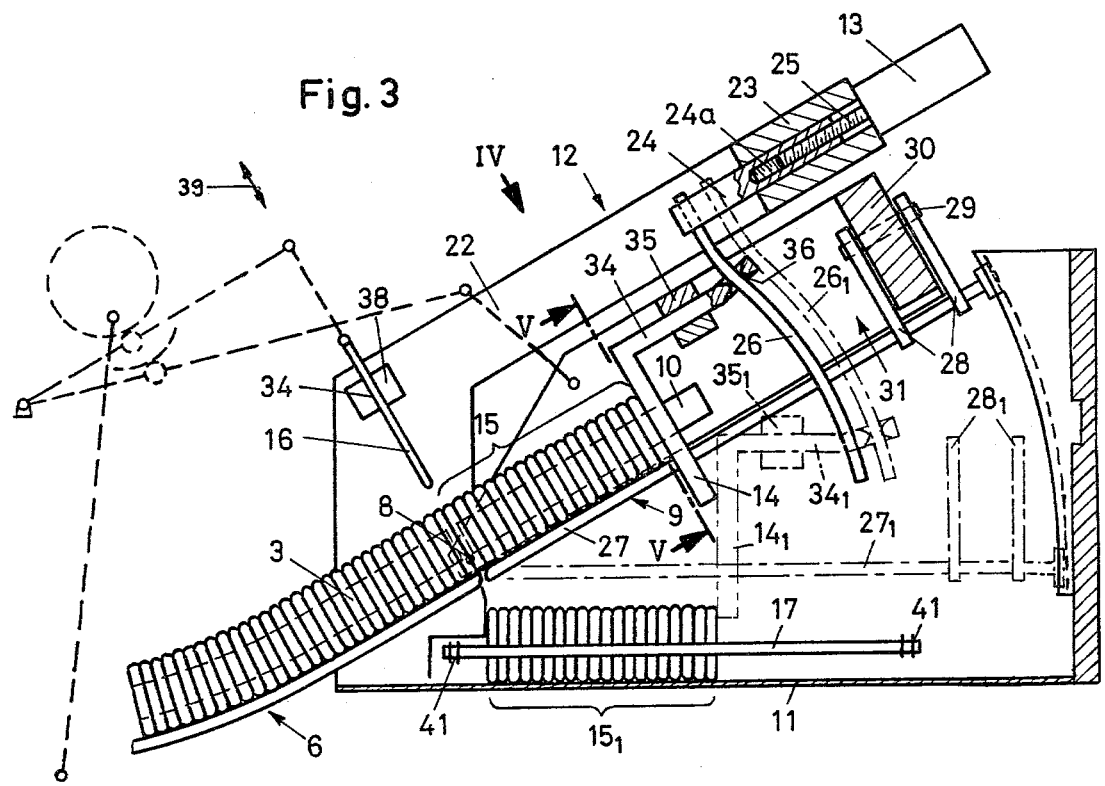
FIG. 3 is a schematic sectional side elevational view of the same embodiment taken along line III—III of FIG. 4.

Turning now to FIGS. 1 and 2, the apparatus shown therein has a wide conveyor belt 1 which serves for advancing, for example, along five parallel conveyor tracks 4, rows of edgewise oriented, stacked disc-like articles (such as crackers or cookies) 3 which are thus conveyed in a direction perpendicular to their main plane. Each row of articles is, on the respective conveyor track 4, laterally supported by two guide walls 5 which are secured to the machine frame. The pairs of guide walls 5 and thus the conveyor tracks 4 start at the discharge end of a baking apparatus (not shown) in which the cookies are baked in a known manner and are then positioned edgewise on the belt 1 between the guide wall pairs, each defining a conveyor track. Each conveyor track 4 changes into a ramp 6 which is bounded on both lateral sides by guide walls 7. The ramp 6 which, in the direction of article feed becomes stepwise steeper, is stationary during normal operation. At its downstream end 8, each ramp 6 changes into a swinging track 9 which has guide walls 10.

In case of malfunctioning, a lower portion (not specifically illustrated) of the respective ramp 6 may be raised so that the articles continuously delivered from the baking apparatus bypass the ramp 6 and thus continue their travel on the belt 1. These articles may thereafter be collected without damaging the same.

Underneath the swinging tracks 9 there extends a table 11 which is oriented transversely to the length dimension of the conveyor belt 1. Each swinging track 9 is associated with a strack-forming device 12 which is provided with a setting device 13 for controlling a stop 14. The latter arrests the leading article of the advancing article series 2, whereupon the associated swinging track 9 is swung downwardly about an axis situated at 8 and the article stack 15 then positioned on the swinging track 9 is deposited onto the table 11 to assume a position $15_1$. At the same time, a separator 16 which forms part of the stack-forming device 12 is, at the location 8, pushed in between the articles 3 to prevent the articles upstream of the stack 15 from being pushed beyond that point during the pivotal motion of the swinging track 9. The pivotal motions of the five swinging tracks 9 occur simultaneously in each operational cycle of the apparatus.

Figure 4:
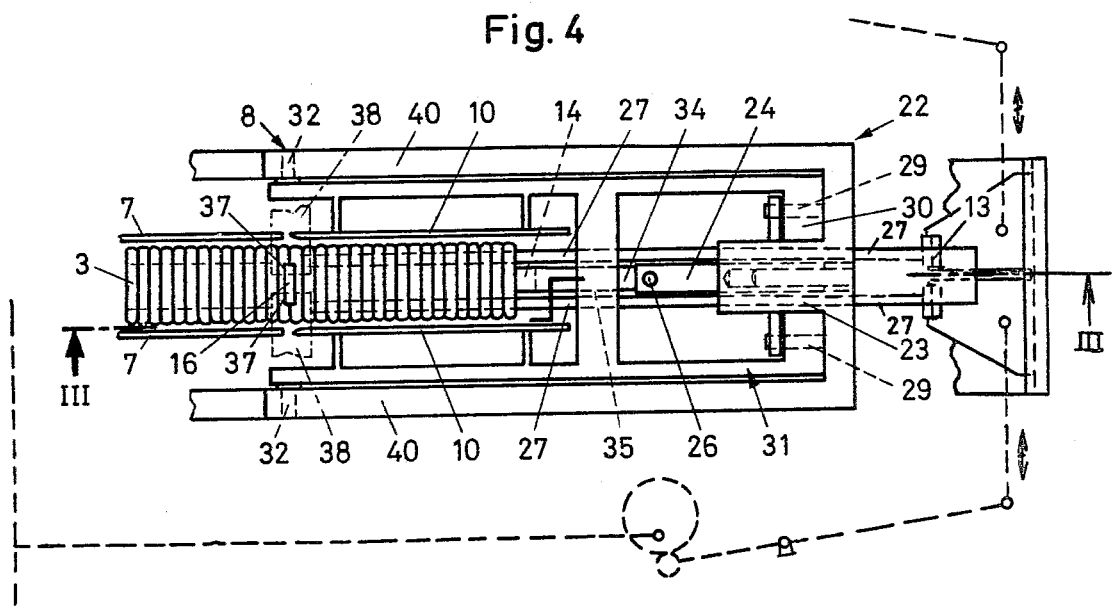
FIG. 4 is a schematic fragmentary illustration of the same embodiment as seen in the direction of arrow IV of FIG. 3.

The stack-forming devices 12 are operated from the packing machine 20 by means of driving shafts, cam discs as well as by reduction gears U, all of which are shown with dotted lines in FIGS. 3, 4 and 7. If there are five stack-forming devices operated from only one packing machine, the drive power is to be balanced with reduction gears by the ratio of 1:5. The articles 3 are conveyed by conveyor 1 such that upon the starting of the lowering stroke of the swinging track there is a complete group 15 thereon.

The stacks $15_1$ are advanced on the table 11 in the direction of the arrow 18 to a scale 19 by means of a chain conveyor having pusher rods 17. In case the weight of a stack weighed on the scale 19 deviates from a desired value by more than a predetermined tolerance, the scale emits a corresponding electric error signal which is applied to the setting device 13 forming part of that stack-forming device 12 which had deposited the just-weighed stack $15_1$ on the table 11.

Figure 8:
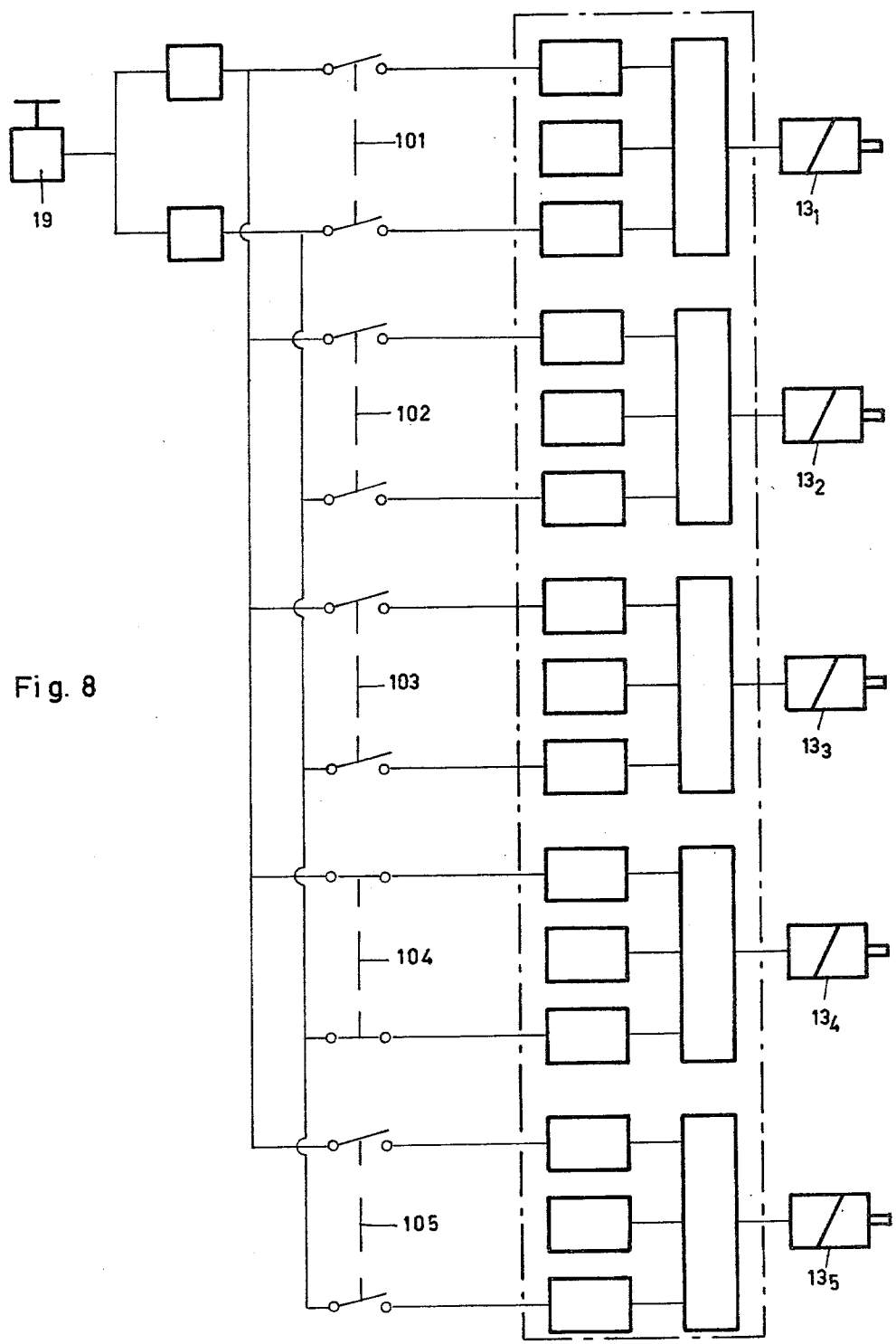
FIG. 8 is a schematic diagram of the connections between the setting devices and the scale.

The above described mode of operation is shown schematically in FIG. 8. For this purpose, five switches 101 through 105 are placed equidistantly around the circumference of a cam disc (not shown) having an actuating pin. During one revolution of the cam disc five stacks $15_1$ are pushed on the platform 45 of the scale 19. Only one of the five switches 101 through 105 with double contacts is closed for influencing the appropriate setting device $13_1$ through $13_5$ by the scale 19. The stack $15_1$ on the scale 19 in FIG. 7 is e.g. from the series associated with setting device $13_4$, so that switch 104 (FIG. 8) is closed. A similar mode of operation is described in Swiss Pat. No. 377,272.

The weight of each stack $15_1$ depends from the properties of the individual articles and from the length of the stack and is thus a function of the distance between the separator 16 and the stop 14. Since the size, the thickness and the consistency (porosity) of the articles (cookies) at the discharge end of the baking apparatus are not constant either along a stretch at a point in time or over a period at a given location, the stacks $15_1$ will not be of constant weight despite a setting of the stack length to a permanent magnitude. But by means of the error signals emitted by the scale 19, the setting devices 13 are controlled in such a manner that they shift the respective stop 14 in the one or the other direction (in the direction of decrease or increase of the stack length) dependent upon whether the sensed weight value exceeds or falls below the tolerance.

The weighed stacks $15_1$ are thereafter advanced from the scale 19 by the chain conveyor to a packing machine 20 which then wraps the stacks in the usual manner and deposits them in a cardboard box or handles them in any other known way. The completed article packages 21 appearing at the discharge end of the packing machine 20 are further conveyed for storage or shipping devices.

In the description which follows, details of the apparatus will be discussed with particular reference to FIGS. 3 through 7.

Turning now in particular to FIG. 3, each stack-forming device 12 has a stationary support 22 secured unilaterally to the table 11. The support 22 carries a guide sleeve 23 in which slides a rod 24 of rectangular cross section. One part of the rod 24 is provided with an inner thread 24a into which threadedly engages a set screw 25. To the outer end of the sleeve 23 there is secured a setting device 13 which, in essence, comprises a motor which has a rotor arranged to turn the set screw 25. At the free end of the rod 24 there is secured a partially arcuate guide bar 26. The center of the radius of curvature of the guide bar 26 lies in the pivotal axis 8 of the swinging track 9. The bottom of the swinging track 9 is formed by two bottom bars 27, each secured to a pair of arms 28 which, in turn, are pivotal about a pin 29. The pin 29 is supported in a block 30 which forms part of a pivotal support 31 which, as shown in FIG. 4, is secured to the stationary support 22 by means of two stub shafts 32 in the pivotal axis 8. The two guide walls 10 are mounted on the pivotal support 31 for guiding the article situated on the swinging track 9.

Turning now to FIG. 5, the arms 28 are shown in full lines in their outwardly pivoted position while the dash-dotted position $27_1$ of the bottom bars 27 corresponds to the inwardly pivoted position (FIG. 3) in which they carry the articles 3 of the stack 15.

Also referring once again to FIGS. 3 and 4, the stop 14 has an extension 34 which is guided in a sleeve 35 of the pivotal support 31 and which has a guide opening 36 through which the bent guide bar 26 passes. At $26_1$ there is shown (FIG. 3), in dash-dotted lines, the position of the guide bar 26 when the rod 24 has been shifted in the sense of increasing the length of a stack 15. $14_1$, $27_1$, $28_1$, $34_1$ and $35_1$ indicate, in dash-dotted lines, the position of the corresponding components subsequent to the downward pivotal motion of the pivotal support 31. The extension $34_1$ has been guided along the arcuate guide 26 which had assumed the position $26_1$.

As further shown in FIGS. 3 and 4, the separator 16 is movable in face-to-face oriented grooves 27 of two guide portions 38 in the direction of the double-headed arrow 39 (FIG. 3). The guide portions 38 project inwardly from two face-to-face oriented legs 40 of the stationary support 22; they are shown in dash-dotted lines in FIG. 4 only in part for the sake of clarity. The drive means for the separator 16 and the pivotal arms 18 are not shown, they may be of conventional construction.

Also referring now to FIG. 7, the means with which the stack $15_1$ is advanced from the table 11 to the scale 19 of the packing machine 20 are of particular construction and form features of the invention. The already-noted chain conveyor with the pushers 17 has two endless chains 41 which engage the ends of the carriers 17 and which advance the stack $15_1$ on the table 11 only until the respective pusher 17 has at least approximately reached its position indicated at $17_1$. Immediately thereafter, the pusher $17_1$ is overtaken by a pusher $42_1$ of a second chain conveyor which has two endless chains 43, the lower flight of which is situated above the upper flight of the chains 41. The velocity $v_2$ of the second chain conveyor is significantly greater than the velocity $v_1$ of the first chain conveyor. The pusher $42_2$ has, as illustrated in FIG. 7, pushed the stack $15_1$ ahead of the pusher $17_2$ on the table 11 onto the scale 19. Thus, at this point the stack $15_1$ is situated on the scale 19 and remains thereon as long as the pusher $17_2$ has overtaken the same and transfers the stack from the scale 19 onto a downstream-arranged table 44 which forms part of the packing machine 20. FIG. 7 depicts pushers $17_3$, $17_4$ and $17_5$ as they perform this operational phase with respective stacks of articles.

It is noted that the articles 3 oriented edgewise on the table 11 or 44 are advanced by the two chain conveyors parallel to the main plane of the articles. In the described example of the two chain conveyors this feature is of significance, since it ensures a rapid advance as well as a dwelling period of sufficient duration on the scale 19. As shown in FIG. 6, the scale 19 has a platform 45 which is provided with two lateral guides 46 to prevent the outermost articles 3 from toppling during the weighing operation. Lateral guides 47 and 48 (FIG. 7) are further provided above the tables 11 and 44 to hold the stacks 15₁ together. By providing that the scale 19 is arranged upstream of the packing machine 20, the control of the setting devices 13 in case of excessive weight alterations of the articles delivered by the baking apparatus is performed much more rapidly than if the completed packages are weighed as it has been practiced with prior art apparatuses.

If it is desired to avoid excessively frequent settings for only slight weight deviations, memory devices for the error signals may be provided and the circuitry may be so designed that in each case only one setting is effected when the stored value has exceeded a predetermined limit value. Such a circuit is disclosed, for example, in Swiss Pat. No. 377,272.

It is an overall particular advantage of the above-described apparatus that it operates with very high accuracy.

It is to be understood that the above description of the present invention is susceptible to various modifications, changes and adaptations, and the same are intended to be comprehended within the meaning and range of equivalents of the appended claims.

We claim:

1. In an article packing system including a first conveyor means for advancing a series of flat articles; at least two stack-forming devices for consecutively forming stacks of variable length from the articles received from the first conveyor means; a second conveyor means extending from the stack-forming devices for carrying away the stacks formed in the stack-forming devices; a packing machine for packaging the article stacks received from the second conveyor means and a scale for weighing the stacks of articles; the improvement wherein said scale is in the conveying path of said second conveyor means and is located downstream of said stack-forming devices and upstream of said packing machine as viewed in the direction of article advance on said second conveyor means; said second conveyor means including a mechanism for successively advancing the article stacks from said stack-forming devices towards said scale in a direction parallel to the plane of the flat articles and sequentially introducing the article stacks into said scale and subsequently advancing them from said scale to said packing machine; further comprising means operatively connecting said scale with said stack-forming devices for varying the length of the stacks in said stack-forming devices as a function of the stack weight measured by said scale.

2. An article packing system as defined in claim 1, wherein said stack-forming devices comprise a movably supported separator having an operative position and a withdrawn position; means for moving said separator into its operative position between the articles for separating the trailing end of the stack from remaining articles upstream thereof.

3. An article packing system as defined in claim 1, wherein said scale includes a platform and lateral guides secured to said platform for holding together the article stack on said platform during weighing by said scale.

4. An article packing system as defined in claim 1, wherein said second conveyor means includes a first chain conveyor extending from said stack-forming devices to said packing machine and having spaced first pusher elements for engaging the article stacks and conveying them in sequence towards said scale; and a second chain conveyor extending from a location upstream of said scale to said scale and having spaced second pusher elements arranged to travel in a conveying path of the article stacks to said scale; means for driving said second chain conveyor with a greater speed than said first chain conveyor for taking over conveyance of the article stacks by said second pusher elements from said first pusher elements onto said scale; said pusher elements being further arranged to deviate from said conveying path at said scale for moving away from the article stack positioned on said scale to allow the respective first pusher elements to take over conveyance of the article stacks from said scale towards said packing machine.

5. An article packing system as defined in claim 4, wherein said first conveyor means comprises a conveyor belt defining, side-by-side, a plurality of parallel tracks each receiving a separate article series; and further wherein with each said track there is aligned a separate said stack-forming device; a separate ramp aligned with each said track for guiding the respective article series to the respective stack-forming device; said second conveyor means comprising a common table situated underneath said stack-forming devices; and means for depositing each article stack formed in the respective article-forming device onto said table for engagement by the respective first pusher elements of said first conveyor chain.

6. An article packing system as defined in claim 1, wherein said stack-forming devices include
(a) a swinging track arranged above said second conveyor means for pivotal motion towards and away from said second conveyor means; said swinging track being arranged to be movable into a raised position in which it receives articles from said first conveyor means and into a lowered position in which it brings the articles positioned thereon into the zone of said second conveyor means;
(b) a bottom forming part of said swinging track and being arranged to be movable into a closed position in which it supports the articles received from said first conveyor means and into an open position in which it releases the articles onto said second conveyor means;
(c) a stop mounted on said swinging track and being arranged in the path of the articles for being abutted by the leading article supported on said swinging track;
(d) stop setting means for displacing said stop along the article path on said swinging track for varying the length of the stack of articles on said swinging track as a function of the weight measured by said scale; and
(e) means for moving said swinging track from its raised position into its lowered position and said bottom from its closed position to its open position when a stack of a length determined by the position of said stop is formed on said swinging track for depositing the article stack from said swinging track on said second conveyor means.

7. An article packing system as defined in claim 6, wherein said bottom is formed of rail members extending parallel to one another in the direction of the article path on said swinging track; further comprising means for moving said rail members towards and away from one another.

8. An article packing system as defined in claim 6, wherein said stop setting means includes a stationarily supported stop setting device; a setting bar connected to said stop setting device for longitudinally displacing said setting bar; said setting bar being connected to said stop.

9. An article packing system as defined in claim 8, further comprising a stationarily supported sleeve for exclusively longitudinally slidably guiding and setting bar; further wherein said setting bar having a threaded bore into which threadedly engages a set screw rotatably connected with said stop setting device.

10. An article packing system as defined in claim 8, further comprising an arcuate connecting bar affixed to said setting bar and slidably guided in said stop for maintaining operative connection between said setting bar and said stop independently from the pivotal position of said swinging track.

11. An article packing system as defined in claim 10, wherin the center of curvature of said arcuate connecting bar substantially lies in the pivotal axis of said swinging track for maintaining the positon of said stop independently from the pivotal position of said swinging track.

* * * * *